United States Patent [19]

Rende, Jr.

[11] Patent Number: 4,690,966

[45] Date of Patent: Sep. 1, 1987

[54] HEAT ACTIVATED SILICON-BASED ADHESIVE

[75] Inventor: Anthony V. Rende, Jr., Erie, Pa.

[73] Assignee: Lord Corporation, Erie, Pa.

[21] Appl. No.: 19,179

[22] Filed: Feb. 26, 1987

[51] Int. Cl.$^4$ .............................................. C08K 5/54
[52] U.S. Cl. .............................. 524/264; 106/287.17; 106/287.19; 156/326; 156/335; 524/176
[58] Field of Search ................. 524/176, 264, 398; 106/287.17, 287.19; 156/326, 335

[56] References Cited

U.S. PATENT DOCUMENTS 4,539,048  9/1985  Cohen .................................. 556/27
4,539,049  9/1985  Cohen .................................. 556/27

Primary Examiner—Paul R. Michl
Attorney, Agent, or Firm—Larson and Taylor

[57] ABSTRACT

Adhesive compositions affording strong bonds of high environmental resistance between elastomers and substrates such as metals are provided. The adhesive compositions comprise an admixture of (i) olefinic organosilane, (ii) water, and (iii) an alumino zirconium metalloorganic complex of chelated aluminum moiety, an organofunctional ligand and zirconium oxyhalide. The adhesive composition preferably includes a polymer resin selected from phenolic-formaldehyde resins, urea-formaldehyde resins, resorcinol-formaldehyde resins or melamine-formaldehyde resins.

8 Claims, No Drawings

HEAT ACTIVATED SILICON-BASED ADHESIVE

FIELD OF THE INVENTION

This invention relates to adhesive compositions suitable for bonding elastomeric materials to other substrates. More particularly the invention is directed to adhesive compositions which afford strong bonds of high environmental resistance between elastomers and substrates such as metal.

BACKGROUND OF THE INVENTION

Compositions, including silicon-based adhesive compositions, for bonding rubber to metal and other substrates are well known in the art.

In the search for the ideal all-purpose adhesive there have been developed a variety of adhesive compositions which have been utilized with varying degrees of success in bonding elastomeric materials to themselves or to other substrates such as metal substrates. As a general rule, the known adhesives which have been effective as simple rubber-to-metal bonding agents are limited with respect to the type of elastomer to be bonded. That is to say, an adhesive which is capable of providing an acceptable bond with butadiene/styrene elastomers may be unsatisfactory with ethylene/propylene/ nonconjugated diene terpolymer (EPDM) elastomer or polyisobutylene/ isoprene elastomer.

In addition to the problem of lack of versatility prior art adhesive compositions, including silicon-based adhesives, tend to suffer from one or more other disadvantages, including a general inability to afford optimum adhesion, particularly at elevated service temperatures; poor storage stability at room and/or elevated temperatures; poor resistance to prebake. Moreover, the resistance of the adhesive bond to environmental conditions such as oils, solvents and moisture is often poorer than normally desired in many commercial applications. Thus, there remains a need for more effective silicon-based adhesive formulations which can be employed in the bonding of various elastomeric materials to substrates such as metal and which exhibit an adhesive bond of improved resistance to degradation from environmental factors.

It is an object of the invention to provide adhesive compositions for bonding a variety of elastomers to various substrates, particularly metal substrates.

Another object of the invention is to provide adhesive compositions which afford strong elastomer-substrate adhesive bonds which exhibit high environmental resistance.

SUMMARY OF THE INVENTION

These and other objects of the invention are obtained by an adhesive composition comprising:
(i) about 2.5 to 70% by weight of an olefinic organosilane
(ii) about 0.25 to 32% by weight water; and
(iii) about 0.25 to 20% by weight on a dry basis of an aluminum zirconium metallo-organic complex of chelated aluminum moiety, an organofunctional ligand and a zirconium oxyhalide, the organofunctional ligand being complexed with and chemically bound to the chelated aluminum moiety and the zirconium;
said aluminum moiety having the formula:
$Al_2(OR_1O)_2A_{ab}B_c$ wherein A or B is hydroxy or halogen and a, b and c are numerical values such that $2a+b+c=6$, and $(OR_1O)$ is an alpha, beta or alpha, gamma glycol group in which $R_1$ is an alkyl group having 1 to 6 carbon atoms or an alpha-hydroxy carboxylic acid residue having the formula:

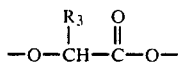

wherein $R_3$ is H or an alkyl group having 1 to 4 carbon atoms;
said organofunctional ligand is an amino functional carboxylic acid having 2 to 18 carbon atoms or a mercaptofunctional carboxylic acid having 2 to 18 carbon atoms; and
said zirconium oxyhalide moiety has the formula:

$ZrA_dB_e$ wherein A and B are as above defined and d and e are numerical values such that $d+e=4$; the molar ratio of chelated aluminum moiety to zirconium oxyhalide moiety being from 1.5 to 10, and the molar ratio of organofunctional ligand to total metal being from about 0.05 to 2.

In a preferred embodiment, the adhesive compositions of the invention optionally include about 1 to 95% by weight, preferably 30% to 70% by weight as measured dry weight, of a polymer resin selected from the group consisting of phenolic-formaldehyde resins, urea-formaldehyde resins, resorcinol-formaldehyde resins and melamine-formaldehyde resins.

The adhesive compositions are preferably diluted with an inert solvent to a total solids content of 1 to 55% by weight, preferably from 1 to 12% by weight. Particularly preferred are adhesive compositions of the invention including phenolic-formaldehyde resins, diluted to a total solids content of about 7% by weight.

DETAILED DESCRIPTION OF THE INVENTION

The olefinic organosilane component of the invention can broadly be described as those organosilane compounds capable of undergoing both the hydrolytic reactions typical of alkyl esters of silicic acid and free radical reactions via the alpha-olefin unsaturated bond that characterizes the compounds.

The preferred organosilanes have the structure:

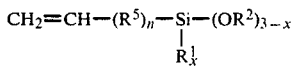

wherein
$R^1$ is a monovalent aliphatic, cycloaliphatic or aromatic radical having from 1 to 20 carbon atoms, and is preferably selected from the group consisting of alkyl radicals having from 1 to 4 carbon atoms, cycloalkyl radicals having from 4 to 7 ring carbon atoms, aryl radicals having 6, 10 or 14 nuclear carbon atoms, and such aryl radicals containing one or more substituent alkyl groups having from 1 to 4 carbon atoms;
$R^2$ is a monovalent aliphatic, cycloaliphatic or aromatic organic radical containing from 1 to 8 carbon atoms and is preferably selected from the group consisting of alkyl radicals having from 1 to 4 carbon atoms, $-R^3-O-R^4-$, and

where $R^3$ is an alkylene group having from 1 to 4 carbon atoms and $R^4$ is an alkyl group having from 1 to 4 carbon atoms;

x is zero or 1, and preferably is zero;

$R^5$ is a divalent hydrocarbon radical, including aliphatic, cycloaliphatic and aromatic divalent radicals, having from 1 to 20 carbon atoms, and is preferably an alkylene of 1 to 4 carbon atoms, cycloalkylene of 4 to 7 carbon ring carbon atoms and arylene of 6 to 14 nuclear carbon atoms; and n is 0 or 1.

Representative organosilanes which are suitable for use in the practice of the invention include without limitation vinyltrimethoxysilane, vinyltriethoxysilane, vinyltripropoxysilane, vinyltributoxysilane, vinylmethyldimethoxysilane, vinylmethyldiethoxysilane, vinylethyldimethoxysilane, vinylethyldiethoxysilane, vinylphenyldimethoxysilane, vinylphenyldiethyloxysilane, vinylcyclohexyldimethoxysilane, 2-propenyltrimethoxysilane, 2-propenyltriethoxysilane; 2-propenylmethyldiethoxysilane, 2-propenylmethyldimethoxysilane, 2-propenylphenyldiethoxysilane, 2-propenylcyclohexyldimethexysilane, 3-butenyltrimethoxysilane, 3-butenyltriethoxysilane, 4-pentenyltriethoxysilane, 4-pentenyltrimethoxysilane, 5-hexenetrimethoxysilane, 5-hexenemethyldimethoxysilane, and the like.

The aluminum zirconium metallo-organic complexes useful in the present invention are commercially available and their preparation is described in detail in U.S. Pat. No. 4,539,049, hereby incorporated by reference.

In the aluminum moiety $Al_2(OR_1O)_aA_bB_c$, pairs of aluminum atoms are joined by bidentate chelating ligands wherein (1) $-OR_1O-$ is an alpha, beta or alpha, gamma glycol in which $R_1$ is an alkyl, alkenyl, alkynyl, or aralkyl group having from 1 to 6 carbon atoms, most preferably 2 to 3 carbon atoms, such ligands to be used exclusively or in combinations within a given composition, or (2) $-OR_1O-$ is an alpha-hydroxy carboxylic acid

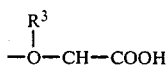

having from 2 to 6 carbon atoms, preferably $R_1$ is 2 to 3 carbon atoms. In each instance the organic ligand is bound to two aluminum atoms through two oxygen heteroatoms.

Examples of chelating ligands ($-OR_1O-$) include: ethylene glycol, propylene glycol, glycerol, etc. Examples of alpha-hydroxy acids $R_3CH(OH)COO-$ are glycolic, lactic, alpha-hydroxybutyric, and tartaric acids and those known in the art.

The organofunctional ligand $-OC(R_2)O-$ is a moiety which can be derived from an aminofunctional carboxylic acid having from 2 to 36 carbon atoms, the preferred range being 4 to 18 carbon atoms.

Examples of specific aminofunctional carboxylate anions, $-OC(R_2))-$ include the anions of glycine, alanine, beta-alanine, valine, leucine, isoleucine, phenylalanine, tyrosine, serine, threonine, methionine, cysteine, cystine, proline, hydroxyproline, aspartic, and glutaric acids.

The stabilized chelated aluminum complex can be prepared by complexing a dimeric aluminum chlorohydrate moiety with bidentate chelating ligand which imparts hydrolytic stability, such as an alpha, beta, or alpha, gamma glycol of 1 to 6 carbon atoms. Complexation of the organofunctional ligand can be achieved by either introducing the ligand to a solution containing only zirconium oxyhalide, preferably zirconium oxychloride, or after the introduction and reaction of the zirconium oxyhalide with the stabilized aluminum chlorohydride. Details of the complexing reactions are given in full in U.S. Pat. No. 4,539,049.

The polymeric resins which may be optionally included in the adhesive compositions of the invention are, for example, condensation products of an aldehyde having from 1 to 8 carbon atoms and phenolic, resorcinol, urea or melamine compounds, all well known and commercially available.

Representative of aldehydes employed in the preparation of these polymer resins are formaldehyde, acetaldehyde, isobutyraldehyde, ethylhexaldehyde and the like and compounds known to be methylene bridge donors.

The phenolic and resorcinol resins are conventionally prepared from the condensation of from about 0.8 to about 3 moles of aldehyde per mol of phenol or resorcinol compound in the presence of basic, neutral or acidic catalysts to afford an organic solvent-soluble resin having a molecular weight in the range of about 300 to 4,000, preferably about 300 to 1200. The presently preferred phenolic resins are the phenolic resols which are condensation products of formaldehyde and phenols.

The urea-aldehyde and melamine resins of similar molecular weight are usually prepared by condensing aldehyde, preferably formaldehyde, with an excess of urea compounds and melamine compounds, respectively, in the presence of a basic catalyst such as pyridine, ammonia or hexamethylenetetramine.

In cases where it is desired to increase or enhance the crosslink state of the polymer resin, the present invention contemplates employing in combination therewith a suitable methylene donor such as hexamethylenetetramine (HEXA) and hexamethoxymelamine (HMMA).

As aforementioned, the components of the adhesive compositions of the invention are preferably dispersed in a solvent and adjusted to a solids content of up to 55%, preferably below 12%. Suitable solvents include polar solvents such as methyl alcohol, ethyl alcohol, propyl alcohol, isopropyl alcohol, butyl alcohol, isobutyl alcohol, ethylene glycol, propylene glycol, butylene glycol, acetone, methyl isobutyl ketone, ethyl acetate, butyl acetate, monoethylether and other aliphatic, cycloaliphatic; aromatic alcohols, ethers, esters and aromatic hydrocarbon solvents such as toluene, xylene, and the like.

The adhesive compositions of this invention may be formulated in any suitable manner using conventional blending techniques. As a general rule, the organosilane and aluminum zirconium metallo-organic complex are first blended together in a portion of the solvent used. The polymeric resin, if employed, is then added either as a solid material or dissolved in the solvent. Finally the mixture is adjusted to the desired solids content.

The thus-prepared admixture is itself suitable for use as an adhesive but the composition can include conventional additives, for example, fillers such as carbon black; pigments, extenders, diluents, corrosion inhibitors and the like, employing conventional techniques for formulating adhesive compositions.

The adhesive compositions of the present invention have been found to be particularly suitable for bonding a wide variety of peroxide-cured elastomeric materials, especially vulcanizable elastomeric materials, to themselves or to other substrates, particularly inorganic substrates. Elastomers which can be bonded include, without limitation, peroxide-cured ethylene/propylene copolymer rubber (EPM); ethylene/propylene/diene terpolymer rubber (EPDM); silicon rubber, fluoroelastomers and the like. Substrates other than the elastomers per se which can be effectively bonded include fabrics such as fiberglass, polyamides, polyesters, aramids, metals and their alloys such as steel, stainless steel, lead, aluminum, copper, brass, bronze, zinc, and the like, including treated metals such as phosphatized steel, galvanized steel, and the like.

The adhesive compositions are applied to the substrate surfaces in a conventional manner such as by dipping, spraying, brushing, and the like. Preferably, the substrate surfaces are allowed to dry after coating before being brought together. After the surfaces have been joined, the composite structures are heated in a conventional manner to effect curing of the adhesive compositions and simultaneous vulcanization of uncured elastomer stock.

The following examples are provided for purposes of illustrating the invention, it being understood that the invention is not limited to the examples nor the specific details therein enumerated. In the examples, amounts are parts by wet weight unless otherwise specified.

In the examples, the substrate to which the elastomeric material was bonded was not primed, unless otherwise noted. The composite assembly was cured at conventional conditions of time and temperature pressure for the specific elastomer. The adhesive bond was tested according to ASTM standard D-429-B at either 45° and 90° peel angles.

The bonded assemblies are subjected to various tests, including room tempertures (RT) pull, the boiling water test and the hot oil test. In the RT pull test, the rubber body is peeled from the metal at a 45° or 90° angle using a Scott tensile tester and the force required in pounds is recorded. In the boiling water test, bonded samples, after having been scored at the bond line and prestressed by bending the rubber body back from the metal, are immersed in boiling water for 2 hours. In the hot oil test, the bonded samples are immersed in 5W-30 motor oil at 300° F., for 70 or 120 hours. The samples so treated are tested for relative bond strength by pulling the rubber body from the metal.

In the data given in the Examples, failure is expressed in terms of percent of failure in the rubber body, e.g., 95 R means that 95 percent of the failure occurred in the rubber body, with the remaining failure being between the adhesive composition and the metal.

EXAMPLE 1

An adhesive formulation was prepared by first adding to an agitated blend tank at room temperature the following ingredients in order:

| Adhesive | % Weight |
|---|---|
| Vinyltriethoxysilane | 6.53 |
| Aluminum Zirconate[1] | 2.33 |

-continued

| Adhesive | % Weight |
|---|---|
| Deionized Water | 1.85 |
| Methyl Alcohol | 89.27 |
| Total Solid Cotent Approx. 7.0% | 100.00 |

[1]Amino aluminum zirconium complex prepared by complexing propanolato aluminum chlorohydrate zirconium oxychloride and $NH_2CH_2CH_2COOH$ at a Al:Zr mole ratio of 9:1.

The thus-prepared adhesive composition was coated on iron phosphatized cold rolled steel coupons and allowed to dry. The coated coupons were then placed into contact with silicone rubber and each assembly cured at 360° F. for 8 minutes at a pressure of 800 psi.

The bonded assemblies were evaluated under the room temperature (RT) pull test and the hot oil test with the following results:

| Lbs. Pull | RT Pull* Failure, % | Hot Oil Test** Failure, % |
|---|---|---|
| 18.6 | 100 R | 100 R |

*90° peel angle
**at 100° F. for 70 hours

EXAMPLE 2

An adhesive formulation was prepared by first adding to an agitated blend tank at room temperature the following ingredients in order:

| Adhesive | % Weight (Wet) |
|---|---|
| Vinyltriethoxysilane | 3.82 |
| Aluminum Zirconante[1] | 9.55 |
| Deionized Water | .636 |
| Phenolic Resin | 1.27 |
| Methyl Alcohol | 84.72 |
| Total Solid Content Approx. 7.0% | 100.00 |

[1]Amino aluminum zirconium complex prepared by complexing propanolato aluminum chlorohydrate zirconium oxychloride and $NH_2CH_2CH_2COOH$ at a Al:Zr mole ratio of 9:1.

Bonded assemblies were prepared using the procedure described in Example 1 and evaluated under the room temperature pull test and the hot oil test as in Example 1 except that the latter was conducted for 120 hours at 300° F. The results of the test were as follows:

| Lbs. Pull | RT Pull* Failure, % | Hot Oil Test Failure, % |
|---|---|---|
| 17.8 | 100 R | 75 R |

*90° peel angle

EXAMPLE 3

The thus-prepared adhesive composition of Example 2 was coated on vapor-degreased, cold rolled steel coupons and allowed to dry. The coated coupons were then placed into contact with EPDM rubber and each assembly cured at 425° F. at 800 psi pressure. Another group of bonded assemblies were similarly prepared except that the coated coupons after drying were prebaked at 260° C. for 5 minutes before contact with the EPDM rubber substrate. The bonded assemblies thus-prepared were subjected to the room temperature pull test with the following results:

| Adhesive | RT Pull* | |
| --- | --- | --- |
| | Lbs. Pull | Failure, % |
| 0' Prebake | 45 | 95 R |
| 5' Prebake | 38 | 95 R |

*90° peel angle

EXAMPLE 4

An adhesive formulation was prepared by first adding to an agitated blend tank at room temperature the following ingredients in order:

| Adhesive | % Weight (Wet) |
| --- | --- |
| Vinyltriethoxysilane | 2.66 |
| Aluminum Zirconate(1) | 12.99 |
| Phenolic Resin | 10.49 |
| Carbon Black | 2.35 |
| Ethyl Alcohol | 62.90 |
| Toluene | 8.61 |
| Total Solid Content Approx. 18.0% | 100.00 |

(1)Amino aluminum zirconium complex prepared by complexing propanaltoaluminum chlorohydrate zirconium oxychloride and NH$_2$CH$_2$CH$_2$COOH at a Al:Zr mole ratio of 9:1.

The thus-prepared adhesive composition was coated on zinc phosphatized cold rolled steel coupons and allowed to dry. One group (0' Prebaked) of the coated coupons were contacted with a silicone rubber substrate and each assembly cured at 340° F. for 15 minutes. Another group of coated coupons (5' Prebaked) were prebaked at 260° C. for 5 minutes before contact and curing with the silicone rubber.

The bonded assemblies were subjected to the RT pull test and the boiling water test with the following results:

| Adhesive | RT Pull* | | Boiling Water Test |
| --- | --- | --- | --- |
| | Lbs. Pull | Failure, % | Failure, % |
| 0' Prebake | 30 | 100 R | 98 R |
| 5' Prebake | 20 | 100 R | 98 R |

*90° peel angle

Further bonded assemblies were prepared by repeating the above procedure but substituting an EPDM rubber substrate for the silicone rubber substrate and curing at 425° F. for 2 minutes. The bonded assemblies were subjected to the RT pull test with the following results:

| Adhesive | RT Pull* | |
| --- | --- | --- |
| | Lbs. Pull | Failure, % |
| 0' Prebake | 50 | 100 R |
| 5' Prebake | 45 | 93 R |

*90° peel angle

The data of the foregoing examples demonstrate the strong adhesion provided by the adhesive compositions of the invention in the bonding of elastomers to metal substrates and also the high environmental resistance that characterizes the adhesive composition of the invention.

It is claimed:

1. An adhesive composition comprising
   (i) about 2.5 to 70% by weight of an olefin organosilane
   (ii) about 0.25 to 32% by weight water; and
   (iii) about 0.25 to 20% by weight on a dry basis of aluminum zirconium metallo-organic complex of chelated aluminum moiety, an organofunctional ligand and a zirconium oxyhalide, the organofunctional ligand being complexed with and chemically bound to the chelated aluminum moiety and the zirconium;

said aluminum moiety having the formula:
   $Al_2(OR_1O)_a A_b B_c$ wherein A or B is hydroxy or halogen and a, b and c are numerical values such that $2a+b+c=6$, and $(OR_1O)$ is an alpha, beta or alpha, gamma glycol group in which $R_1$ is an alkyl group having 1 to 6 carbon atoms or an alpha-hydroxy carboxylic acid residue having the formula:

$$-O-CH-\underset{\underset{R_3}{|}}{C}\overset{\overset{O}{\|}}{\phantom{C}}-O-$$

wherein $R_3$ is H or an alkyl group having 1 to 4 carbon atoms;

said organofunctional ligand is an aminofunctional carboxylic acid having 2 to 18 carbon atoms or a mercaptofunctional carboxylic acid having 2 to 18 carbon atoms; and said zirconium oxyhalide moiety has the formula:

$ZrA_d B_e$ wherein A and B are as above defined and d and e are numerical values such that $d+e=4$; the molar ratio of chelated aluminum moiety to zirconium oxyhalide moiety being from 1.5 to 10, and the molar ratio of organofunctional ligand to total metal being from about 0.05 to 2.

2. An adhesive composition according to claim 1 wherein the organofunctional ligand is an aminofunctional carboxylic acid having 2 to 6 carbon atoms.

3. An adhesive composition according to claim 2 wherein the aminofunctional carboxylic acid is NH$_2$CH$_2$CH$_2$COOH.

4. An adhesive composition according to claim 1 wherein the olefinic unsaturated organosilane is vinyl silane.

5. An adhesive composition according to claim 1 including about 1 to 95% by weight of an organic solvent-soluble polymer resin selected from the group consisting of phenolic-formaldehyde resins, urea-formaldehyde resins, resorcinol-formaldehyde resins and melamine-formaldehyde resins.

6. An adhesive composition according to claim 5 wherein the polymer resin is a phenolic-formaldehyde resin.

7. An adhesive composition according to claim 6 wherein the phenolic-formaldehyde resin comprises the reaction product of an aromatic hydroxy compound and an aldehyde having from 1 to 8 carbon atoms.

8. An adhesive composition according to claim 1 wherein said aromatic hydroxy compound is o-cresol.

* * * * *